United States Patent Office 2,824,462
Patented Feb. 25, 1958

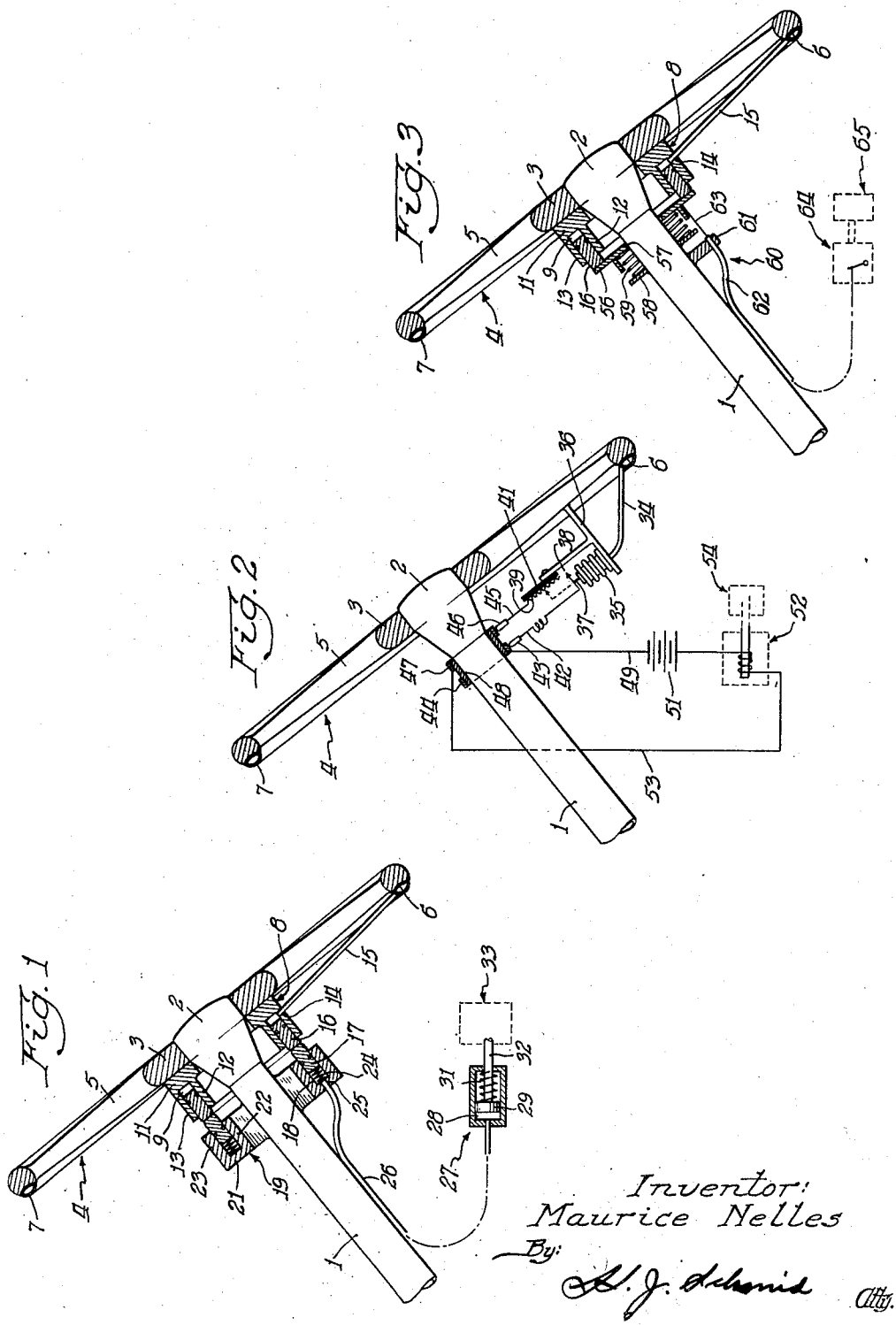

2,824,462

STEERING WHEEL MOUNTED CONTROL DEVICE

Maurice Nelles, Elmhurst, Ill., assignor to Borg-Warner Corporation, Chicago, Ill., a corporation of Illinois Application October 26, 1953, Serial No. 388,349

6 Claims. (Cl. 74—484)

The present invention relates to control means for association with a vehicle steering wheel and more particularly to a manually actuable control mechanism having a portion thereof mounted to and carried by a vehicle steering wheel.

It is well known that modern automotive vehicles frequently travel at high speeds, and that when operated at such speeds an appreciable period of time elapses between the instant at which the vehicle operator recognizes the occurrence of a dangerous condition in his path and the instant at which the operator begins to apply the conventional vehicle brake. Scientific determination of the length of this period, sometimes referred to as "reaction time," has indicated that an automotive vehicle driven by an average operator at a speed of 50 M. P. H. will travel approximately 55 feet during this period of time prior to the instant at which the first braking effort is applied. Obviously, and unfortunately, many tragic accidents are the result of this extended travel of the automotive vehicle prior to the instant at which the conventional foot-manipulated brakes are applied thereto. One object of the present invention is, therefore, the provision of a device so constructed and arranged that the aforementioned "reaction time" may be materially reduced.

Furthermore, it is well known that many persons, who are crippled or otherwise physically handicapped, have difficulty in operating modern automotive vehicles, and that, while many devices have been constructed which would tend to aid many of these unfortunate persons in operating automobiles, these devices have not always heretofore been successful. The lack of success of these prior devices has been due either to the expense, complexity, or bulkiness, of such devices. It is, therefore, another object of the present invention to provide a device which will aid many handicapped persons in the operation of automotive vehicles.

Other objects of the invention include the provision of a control mechanism having a portion thereof mounted directly to the vehicle steering wheel.

Another object of the present invention is the provision of a device in accordance with the preceding object in which a collapsible fluid containing receptacle is mounted to the steering wheel of the vehicle, the receptacle being associated with and operating a controlled device by virtue of an increase of fluid pressure therein.

Another object of the present invention is a device in accordance with the preceding objects in which the control structure is mounted to a steering column and is connected to a fluid containing receptacle upon the vehicle steering wheel, the control structure being fluid pressure operated.

Another object of the present invention is the provision of a device in accordance with the preceding objects in which the fluid containing receptacle is mounted within a suitable channel in the vehicle steering wheel so as not to interfere with the normal operation of the steering wheel yet being readily collapsed by the vehicle operator so as to effect a control function.

Another object of the present invention is the provision of a device in accordance with the preceding objects in which a vehicle steering wheel having a suitable channel therein is provided, a collapsible fluid-containing receptacle being disposed in and mounted to the channel, the receptacle being connected by fluid transmitting means to control means mounted on the vehicle steering column, the control means being fluid pressure operable and either hydraulic, electrical or mechanical in nature.

Another object of the present invention is the provision of a device in accordance with the preceding objects in which manual operation of the fluid-containing receptacle effects a change in the position in at least certain elements of the control mechanism mounted upon the vehicle steering column whereby a control function is effected.

Other objects and advantages of the present invention will be apparent in the following detailed description taken in conjunction with the drawings wherein:

Figure 1 is a diagrammatic representation of a first form of my invention which is shown partly in section;

Figure 2 is a diagrammatic representation of a second form of my invention, shown partly in section;

Figure 3 is a diagrammatic representation of a third form of my invention, shown partly in section.

Referring first to the embodiment of my invention illustrated in Figure 1, there is disclosed therein a conventional steering column 1 having rotatably mounted thereon a head portion 2 of conventional nature. Mounted to the head portion 2 is a hub 3 of a steering wheel assembly indicated in its entirety by the numeral 4 which includes an annular, manually operable wheel portion 5 joined to hub 3 by suitable conventional means (not shown), such as spokes, whereby rotative movement of the portion 5 effects rotative movement of the portion 3 and the head 2 in conventional manner. The wheel portion 5 is formed so as to integrally provide a channel 6 forming one surface of the wheel 5. Mounted within the channel 6 is a fluid-containing receptacle or tube 7 which may extend throughout the length of the channel 6, or extend over only a portion thereof as desired. The receptacle 7 should be of a resilient, hermetic material, such as rubber, capable of both containing a fluid and normally assuming the form illustrated in Figure 1, but collapsible by manual grasping thereof. A suitable cement may be employed to firmly mount the receptacle 7 within the channel 6, as will be readily apparent to those skilled in the art.

Mounted to the hub 3, for rotation thereby, by suitable means (not shown) is an annular block 8 having integrally formed therein an annular cavity 9 extending partially through the block 8 and defined by back wall 11 of the block 8 and interior and exterior walls 12 and 13 respectively thereof. The exterior wall 13 is provided with a suitable aperture 14, as shown in Figure 1, which communicates the cavity 9 with a fluid-transmitting line 15 suitably connected to both the block 8 and the receptacle 7 so as to provide a fluid transmitting connection therebetween.

Within the cavity 9, there is disposed an annular piston 16 having near the innermost portion thereof suitable sealing means, such as rubber O rings, so that hydraulic fluid within the cavity 9 may not escape past the sides of the piston 16. The piston 16 is of such dimension, however, as to be capable of reciprocatory movement within the cavity 9 in a manner and for a purpose to be subsequently more fully explained.

In engagement with the outermost surface of the piston 16 is a surface of a second annular piston 17 mounted for reciprocatory movement within an annular cavity 18 of a stationary block 19. Block 19 is fixedly mounted to the column 1, and comprises a bottom wall 21, and interior and exterior walls 22 and 23, respectively, which form the cavity 18. Interposed between the bottom wall 21 and the annular piston 17 are suitable springs 24 which operate to bias the annular piston 17, and the annular piston 16, into the position illustrated in Figure 1.

The bottom wall 21 of the block 19 is provided with an aperture 25 which communicates the cavity 18 with a fluid-transmitting line 26 connected to a suitable hydraulically operated pilot device, indicated generally by the numeral 27. For the purpose of illustration, the pilot mechanism is disclosed as a cylinder 28 having a piston 29 therein biased toward the left in Figure 1 by a spring 31. The piston 29 is disclosed as having a portion 32 connected to operate a suitable control mechanism illustrated diagrammatically and referred to in its entirety by the numeral 33. It will be readily apparent to those skilled in the art that the mechanism 33 may be, for example, power braking mechanism, a clutch operating mechanism, or the like. It will also be apparent to those skilled in the art that the pilot mechanism 27 may be either a cylinder-piston means as shown, or other suitable hydraulically operated means.

It will be seen that the embodiment of the invention illustrated in Figure 1 comprises two separate hydraulic systems. One of these systems includes the receptacle 7, the line 15, and the piston 16 in the cavity 9 in the block 8. The other system comprises the piston 17 in the cavity 18 of the block 19, the line 26 and the pilot device 27. Each of these systems are maintained full of suitable hydraulic fluid.

The embodiment of the invention illustrated in Figure 1 is operable in the following manner. Normally, as pointed out, the receptacle 7 is in the form illustrated in Figure 1. When the vehicle operator desires to actuate the disclosed control mechanism, for example to operate a power braking system, the operator need only squeeze the portion of the receptacle 7 normally in his grasp. As the wall of the receptacle 7 is thereby collapsed, the volume of the receptacle 7 is decreased so that pressurized fluid flows from receptacle 7 through the line 15 and aperture 14 into the cavity 9. Fluid pressure within the cavity 9 will thereby be correspondingly increased, and the piston 16 will be forced outwardly to accommodate the fluid entering into the cavity 9. As piston 16 moves outwardly, piston 17 is moved against the bias of the spring 24 (downwardly in the view of Figure 1) to decrease the fluid-containing volume of the cavity 18. The excess fluid therein will therefore be forced through the aperture 25 to the fluid transmitting line 26 to operate the pilot mechanism 27 and thereby effect the operation of the control means 33.

Upon the release of the squeezed portion of receptacle 7, its inherent resiliency will cause it to again assume the form illustrated in Figure 1. Spring 24 will therefore operate to force piston 17 upwardly, and piston 16 will be moved inwardly of cavity 9 to force some of the fluid therein back through line 15 to refill receptacle 7. As the piston 17 moves outwardly of cavity 18, spring 31 will effect return of piston 29 to the position illustrated, and fluid will be forced upwardly through line 26 to refill that portion of cavity 18 which is not occupied by piston 17.

In the embodiment of the invention illustrated in Figure 2, there is disclosed the conventional steering column 1 having a rotatable head 2 thereon. Mounted to the head 2 is a hub 3 of a steering wheel assembly indicated generally by the numeral 4, which comprises a wheel 5 having a channel 6 formed in and along one side thereof. Mounted within the channel 6 is a pressure tube 7 comparable to that illustrated in Figure 1. The tube 7 has connected thereto, in fluid communicating engagement, one end of a fluid-transmitting line 34, the other end of which is connected to a hydraulic bellows 35 of flexible material. Bellows 35 is rigidly mounted upon a bracket 36, of insulating material, which is connected to the wheel 5 for rotation therewith. Mounted upon the bellows 35 so as to be movable upon expansion and contraction thereof is a post 37 having an electrical contact 38 at one end thereof. Disposed for cooperation with the contact 38, upon expansion of the bellows 35 is an electrical resistor 39 mounted upon a suitable insulating plate 41, which is itself rigidly mounted to an arm of the bracket 36.

The contact 38 is electrically connected by means of a conductor 42 to an electrical contact 43 which is constantly held by suitable means such as a spring (not shown) in sliding engagement with a conducting ring 44. The resistor 39 is connected by a conductor 45 to an electrical contact 46 which is constantly held by suitable means (not shown) in sliding engagement with a conducting ring 47. The rings 44 and 47 are fixedly mounted to an insulating collar 48 which is itself fixedly mounted by suitable means to the steering column 1. The ring 44 is connected by means of a conductor 49 to one terminal of a source of electrical energy, illustrated as a battery 51, the other terminal of which is connected to a suitable pilot device 52. The ring 47 is connected by a conductor 53 to the opposite side of the device 52, whereby the electrical circuit may be completed from one terminal of the battery 51 through the conductor 49, the ring 44, the contact 43, the conductor 42, the contact 38, the resistor 39, the conductor 45, the contact 46, the ring 47, the conductor 53, and the pilot device 52. The pilot device 52, which may be a solenoid, a potentiometer or the like, is connected to operate a control means 54, which may be a power brake control, or a clutching device. It is obvious that a suitable protecting means, such as a casing, may be provided to prevent inadvertent contact with the electrical circuit described.

The operation of the embodiment of the invention illustrated in Figure 2 will now be described. When the receptacle 7 is in its normal condition, it is in the form illustrated, and is filled with suitable hydraulic fluid, as is the line 34 and bellows 35. The bellows 35 occupies the position illustrated in which the electrical contact 38 is in the position shown in full lines in Figure 2. In this position, no electrical connection between the contact 38 and the resistor 39 exists whereby the electrical circuit is de-energized. When the vehicle operator squeezes the tube 7 so as to collapse a portion thereof, fluid will flow through the line 34 into the bellows 35 which will expand to move the electrical contact 38 into engagement with and along the resistor 39 (as shown in dotted lines in Figure 2). As soon as contact 38 engages resistor 39, current will flow through the before-described electrical circuit from the battery 51 through pilot device 52 whereby control means 54 will be operated. It will be obvious to those skilled in the art that varying amounts of current will flow through the device 52, in response to movement of the contact 38 to varying positions along the resistor 39, to cause concurrent controlled movement of the device 54.

Release of receptacle 7 causes bellows 35 to resume its original position, forcing some of the fluid therein out through line 34 to refill receptacle 7. In this original position of bellows 35, contact 38 no longer engages resistor 39 so that the electrical circuit described is de-energized.

Referring now to the embodiment of the invention illustrated in Figure 3, there is disclosed therein a steering column 1 having a head 2 rotatable mounted thereon. Mounted to the head 2 is a hub 3 of a steering wheel assembly indicated generally by the numeral 4, which comprises a steering wheel 5 having a channel 6 which is formed therein. A flexible, fluid-containing receptacle 7 is mounted by suitable means within the channel 6. Mounted to the hub 3 so as to be rotated thereby is an annular block 8, similar to the block 8 of Figure 1, having formed therein an annular cavity 9 defined by a back wall 11, an interior wall 12, and an exterior wall 13 of the block 8. The wall 13 is provided with a suitable aperture 14 receiving one end of a fluid transmitting tube 15, the other end of which is connected in fluid transmitting engagement with the receptacle 7. Mounted within the cavity 9 for reciprocatory movement therein is an annular piston 16 which is provided with suitable sealing means at the interior portion thereof which prevents the escape of hydraulic fluid.

Mounted in an abutting engagement with the exterior surface of the piston 16 is a plate 57 having a centrally located aperture therein through which the steering column 1 loosely extends. Fixedly mounted upon the column 1 is a bracket 58, and interposed between the bracket 58 and the plate 56 is a coil spring 59 surrounding the column 1 and which biases the plate 56 (and the piston 16) to the position illustrated in Figure 3. Also rigidly mounted on the column 1 is a post 61 which serves as a support for a Bowden wire assembly, indicated generally by the numeral 60, and comprising a tube 62, which is suitably secured to the post 61, and a wire 63 connected to the plate 56. The wire 63 is connected to a pilot device (which may be a valve, a switch, or the like), indicated generally by the numeral 64, the pilot device controlling the operation of a control means 65 which may be a power brake, or clutching mechanism as desired.

In the operation of the embodiment of applicant's invention illustrated in Figure 3, when the tube 7 occupies in its entirety the position illustrated in Figure 3, the spring 59 will bias the plate 56 and the piston 16 to the position illustrated in Figure 3 whereby the wire 63 of the Bowden wire assembly 60 is in one position. When the receptacle 7 is squeezed by the vehicle operator, some of the fluid contained therein is forced out through the line 15 and the aperture 14 into the cavity 9. The piston 16 is moved outwardly thereby to effect downward movement of the wire 63 of the Bowden assembly wire 60 which will operate the pilot device 64 and consequently the control means 65. Release of the squeezed portion of receptacle 7 permits spring 59 to return plate 56 to the position illustrated in Figure 3. Piston 16 is thereby moved inwardly of cavity 9 so that fluid is forced outwardly through line 15 to refill receptacle 7. As plate 56 moves upwardly, it will carry wire 63 therewith to its initial position so that pilot device 64, and control means 65, assume their original condition.

It will be seen that the device of the present invention is of such nature that, when employed to control a braking mechanism of an automotive vehicle, the "reaction time" of the ordinary driver is materially reduced inasmuch as it is unnecessary for the operator of the vehicle to release the accelerator to operate the brake pedal. The operator need only grasp the steering wheel more tightly to effect the application of the brakes, and it is obvious that this grasping of the steering wheel may be accomplished almost instantaneously with the recognition of a dangerous condition in the path of the vehicle. In this regard, it should be noted that it is unnecessary for the driver to move his arms to apply the brakes of the vehicle. It should further be noted that the flexible, fluid-containing receptacle, mounted to the steering wheel, may be of such nature that the brakes, or other control mechanism, may be applied by using only one hand.

It will further be obvious that the device of the present invention is of such nature that many handicapped persons who were previously unable to operate an automotive vehicle may, with this device, be enabled to do so.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. In an automotive vehicle having a steering column, the combination which comprises a steering wheel having integrally formed therein a recessed portion which extends along one surface thereof, a flexible and fluid-tight container, means mounting said container within said recessed portion of said steering wheel, a cylinder, a piston within said cylinder, fluid-transmitting means interconnecting said flexible container and said cylinder, means biasing said piston toward one position, and means responsive to movement of said piston against said biasing means to a second position to effect a control function, flexing of said flexible container effecting a transfer of fluid from said flexible container through said fluid-transmitting means into said cylinder and consequent movement of said piston to said second position.

2. The device defined in claim 1 in which means for biasing said piston toward one position comprises a post mounted to the steering column, a movable annular member surrounding the steering column, and a spring interposed between said post and said annular member biasing said annular member into engagement with said piston.

3. The device defined in claim 1 in which means for biasing said piston toward one position comprises a post mounted to the steering column, a movable plate surrounding the steering column, and a spring interposed between said post and said plate biasing said plate into engagement with said piston; and in which said means movable to effect a control function comprises a Bowden wire assembly consisting of a tube and a wire and means for connecting said wire to said plate.

4. In an automotive vehicle having a steering column, the combination which comprises a steering wheel having integrally formed therein a recessed portion which extends along one surface thereof, a flexible and fluid-tight container, means mounting said container within the said recessed portion of said steering wheel, a cylinder block mounted for rotation with said steering wheel and having a annular passage therein, an annular piston in said passage and adapted for reciprocatory movement therein, fluid-transmitting lines interconnecting said passage and said flexible container whereby upon flexure of said flexible container fluid is forced through said fluid transmitting lines into said passage, means in engagement with said piston and biasing said piston toward one position, and means movable in response to movement of said means in engagement with said piston to effect a control function, said means in engagement with said piston being moved in response to movement of said piston outwardly of said passage as fluid enters said passage upon flexure of said flexible container.

5. The device defined in claim 4 in which said means biasing said piston toward one position comprises a second annular piston, a stationary block having a cavity therein in which said second piston is disposed for reciprocatory movement, and a spring within said cavity engaging said second piston and biasing it into engagement with said first piston.

6. The device defined in claim 4 in which said means biasing said piston toward one position comprises a second annular piston, a stationary block having a cavity therein in which said said piston is disposed for reciprocatory movement and a spring within said cavity engaging said second piston and biasing it into engagement with said first piston; and in which said means movable in response to movement of said last-mentioned means comprises a fluid disposed within said cavity and ejected therefrom by virtue of movement of said second piston against the bias of said spring.

References Cited in the file of this patent

UNITED STATES PATENTS

| | | |
|---|---|---|
| 949,297 | Frentzen | Feb. 15, 1910 |
| 1,317,491 | Haiss | Sept. 30, 1919 |
| 1,492,606 | Robinson | May 6, 1924 |

(Other references on following page)

UNITED STATES PATENTS

| | | |
|---|---|---|
| 1,519,172 | Stewart | Dec. 16, 1924 |
| 1,521,517 | Fairbank | Dec. 30, 1924 |
| 1,583,642 | Bailey | May 4, 1926 |
| 2,036,619 | Brown et al. | Apr. 7, 1936 |
| 2,223,800 | Fines | Dec. 3, 1940 |
| 2,270,900 | Rubissow | Jan. 27, 1942 |
| 2,373,745 | Conway | Apr. 17, 1945 |
| 2,470,273 | Von Uffel | May 17, 1949 |
| 2,471,244 | Self | May 24, 1949 |
| 2,507,484 | Stone | May 9, 1950 |
| 2,563,339 | Kellogg | Aug. 7, 1951 |
| 2,648,993 | Kemp | Aug. 18, 1953 |
| 2,737,021 | Edge et al. | Mar. 6, 1956 |